US 10,432,063 B2

United States Patent
Zahlen et al.

(10) Patent No.: US 10,432,063 B2
(45) Date of Patent: Oct. 1, 2019

(54) MAGNETICALLY LEVITATED ARRANGEMENT AND USE OF MAGNETICALLY LEVITATED ARRANGEMENT OF THIS KIND

(71) Applicant: Airbus Operations GmbH, Hamburg (DE)

(72) Inventors: Pierre Zahlen, Hamburg (DE); Ingo Krohne, Hamburg (DE); Matthias Hegenbart, Hamburg (DE); Peter Linde, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 305 days.

(21) Appl. No.: 15/439,043

(22) Filed: Feb. 22, 2017

(65) Prior Publication Data
US 2017/0244341 A1    Aug. 24, 2017

(30) Foreign Application Priority Data
Feb. 24, 2016   (DE) .................. 10 2016 202 825

(51) Int. Cl.
*H02N 15/00*   (2006.01)
*B60L 13/04*   (2006.01)
*H02K 7/09*   (2006.01)

(52) U.S. Cl.
CPC .............. *H02K 7/09* (2013.01); *B60L 13/04* (2013.01); *H02N 15/00* (2013.01)

(58) Field of Classification Search
CPC ........... H02N 15/00; B60L 13/04; H02K 7/09
(Continued)

(56) References Cited

U.S. PATENT DOCUMENTS

| 5,388,527 A * | 2/1995 | Thornton ................ B60L 13/04 104/284 |
| 6,885,266 B2 * | 4/2005 | Ochi-Okorie .......... H02K 41/00 310/90.5 |

(Continued)

FOREIGN PATENT DOCUMENTS

JP   2012019618   1/2012

OTHER PUBLICATIONS

German Search Report, dated Sep. 7, 2016, priority document.

*Primary Examiner* — John K KIM
(74) *Attorney, Agent, or Firm* — Greer, Burns & Crain, Ltd.

(57) ABSTRACT

A magnetically levitated arrangement for contactless movement over a surface comprising a magnetizable reaction surface and a magnetically levitated unit arranged to interact with the reaction surface. The levitated unit has at least one pair of rotatable rotary magnet units, each unit rotatable about a rotation axis and having magnetic elements arranged with alternating poles and respectively substantially parallel to the rotation axis in a pole connection direction. Each rotary unit pair is formed to interact, due to rotation of the two rotary units in opposite directions relative to one another and relative to the reaction surface, in such a way with the reaction surface, that forces are generated holding the levitated unit at a distance from the reaction surface, and due to the opposite rotation directions of the rotary units of each pair, a directed drive force moving the levitated unit relative to the reaction surface is generated.

11 Claims, 5 Drawing Sheets

(58) Field of Classification Search
USPC .............................................. 310/12.05, 90.5
See application file for complete search history.

(56) References Cited

U.S. PATENT DOCUMENTS

| | | | |
|---|---|---|---|
| 8,368,271 B2 * | 2/2013 | Wiggins | H02K 7/025 |
| | | | 310/103 |
| 9,744,878 B2 * | 8/2017 | Melvin | A63C 17/00 |
| 9,862,288 B2 * | 1/2018 | Melvin | A63C 17/00 |
| 10,173,549 B2 * | 1/2019 | Melvin | A63C 17/00 |
| 2016/0039310 A1 * | 2/2016 | Melvin | B60L 13/04 |
| | | | 180/65.8 |
| 2017/0244341 A1 * | 8/2017 | Zahlen | B60L 13/04 |

\* cited by examiner

MAGNETICALLY LEVITATED ARRANGEMENT AND USE OF MAGNETICALLY LEVITATED ARRANGEMENT OF THIS KIND

CROSS-REFERENCES TO RELATED APPLICATIONS

This application claims the benefit of the German patent application No. 10 2016 202 825.1 filed on Feb. 24, 2016, the entire disclosures of which are incorporated herein by way of reference.

BACKGROUND OF THE INVENTION

The invention relates to a magnetically levitated arrangement for contactless movement relative to a material surface and use of such a magnetically levitated arrangement for contactless movement relative to a fiber composite material surface.

In aircraft construction, fiber composites are being used increasingly, for example in the aircraft cabin, generally in the interior of the fuselage and in the aircraft outer skin. Depending on the function and installation location, even very complex structures made from fiber composite material are used. Repetitive work sequences in the manufacture of fiber composite components are already automated. Thus it is known to use robots to carry out work on fiber composite surfaces, which robots can be moved on the fiber composite surface for this purpose. Such robots can have a linear belt drive, for example, similar to tracked vehicles. Furthermore, they can travel on wheels or utilize vacuum suction technology for movement. However, such approaches have little flexibility and are limited in respect of access to all, in particular very tight or low, areas, as in the interior of an aircraft. The manufacturing costs of such robots, the set-up times for using the robots (e.g., application of vacuum rails) and their usability (e.g., in the case of direct contact of the robot belt drive or the wheels of the robot with, or due to suction of the robot on fiber composite surfaces, can damage be caused to the same) currently have a limiting effect on automation in the working field of fiber composites. Moreover, the approaches described above are limited to application in the area of outer surfaces, such as, e.g., the outer fuselage. For the inner fuselage only a few of the above approaches are applicable. For areas of the cargo hold or in the belly of the aircraft, in particular, that is, where automation would be desirable on account of the poor ergonomic conditions, the above approaches are not applicable.

Figure 1:
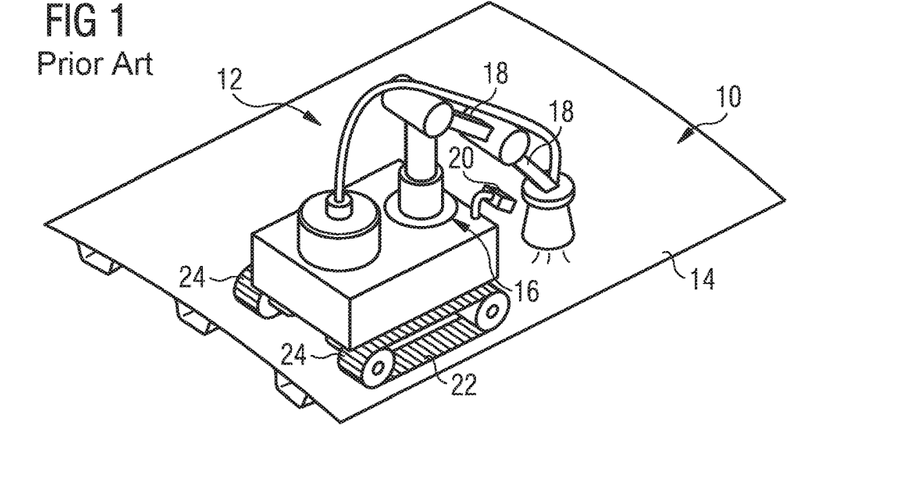
FIG. 1 shows the use of a suction robot for cleaning a fiber composite surface according to the prior art, wherein the suction robot travels on belt conveyors directly on the surface to be cleaned, as already described in the introduction.

FIG. 1 shows an example of a known automation in the final cleaning of fiber composite components, such as a part of the aircraft outer skin 10. In the manufacture of fiber composite components, it is important as part of the final finishing to free the component surface of residues, waste residues and dust from the manufacturing process, that is, to clean it. Among other things, a vacuum cleaner 12 is now used for this purpose, which is carried and guided by a robot 16 that can travel on the component surface 14. To guide the vacuum cleaner 12, the robot 16 has a controllable robot hinged arm 18. The cleaning of the component surface 14 can be monitored by a camera 20 of the robot 16. To travel along the component surface 14 to be cleaned, the robot 16 can, as shown in FIG. 1, be provided with a belt drive 22 (similar to that of a tracked vehicle, such as a bulldozer). A plurality of, for example four, wheels can also take the place of the belt drive 22 shown.

In spite of automation, this cleaning process has the disadvantage that the belt drive 22 shown or the wheels provided in its place on the robot 16 carrying and guiding the vacuum cleaner 12 has/have to come into physical contact with the component surface 14 to move the robot 16 on the component surface 14. However, this causes wear of the belts 24 of the belt drive 22 or of the wheels provided instead. Contaminants from outside are often also introduced onto the component surface 14 due to the direct contact between robot 16 and component surface 14. Furthermore, dust can also be swirled around. Moreover, the drive belts 24 or wheels provided instead of these can bump thin and sensitive fiber composite structures and possibly even cause damage.

The necessity therefore exists of providing an arrangement that can be moved relative to a material surface without the problems indicated above occurring, and which can contribute to the automation optimization of manufacturing and servicing processes for fiber composite components.

SUMMARY OF THE INVENTION

An arrangement that takes account of the above requirements is a magnetically levitated arrangement for contactless movement relative to a material surface as described below. The magnetically levitated arrangement comprises at least one magnetizable reaction surface and at least one magnetically levitated unit, which is adapted to be arranged relative to the reaction surface in order to interact therewith. The at least one magnetizable reaction surface of this kind may be the material surface itself, for example. If the material surface itself is not magnetizable or at least not sufficiently magnetizable, the at least one reaction surface may be at least one section of a carrier structure supporting the material surface. Alternatively to this, the reaction surface may be provided as a component separate from the material surface or from a carrier structure supporting the material surface, for example in the form of a magnetizable plate. All ferromagnetic materials can be considered as possible materials for the magnetizable reaction surface; copper may be cited here as an example. Paramagnetic materials, such as aluminum, for example, may also be used as a magnetizable reaction surface.

The magnetically levitated unit further has at least one pair of rotatably supported rotary magnet units, each rotary magnet unit being rotatable about an axis of rotation and having a plurality of magnetic elements arranged with alternating poles and respectively substantially parallel to the axis of rotation in a pole connection direction. The axes of rotation of the rotary magnet units run preferably parallel to one another. In use of the magnetically levitated arrangement, the rotary magnet units are preferably arranged in such a way relative to the reaction surface that the magnetic elements of the rotary magnet units are aligned in the pole connection direction perpendicularly to the reaction surface. The magnetic elements may be permanent magnets or electromagnets. Due to the alternating pole orientation of adjacent magnetic elements in the rotary magnet unit, virtually no magnetic effect is detectable any longer outwardly, that is, outside the rotary magnet unit. Each pair of the rotary magnet units is formed to interact, by rotation of the two rotary magnet units, in opposite directions relative to one another and relative to at least one reaction surface, with the reaction surface in such a way that forces holding the at least one magnetically levitated unit at a distance from the at least one reaction surface are generated and, due to the opposite directions of rotation of the rotary magnet units of each pair, a directed drive force moving the magnetically levitated unit relative to the reaction surface can be generated. Directed drive force is understood to mean that the rotary magnet units of each pair can be rotationally controlled in such a way that a predetermined path can be traveled relative to the material surface.

The magnetic elements of each rotary magnet unit produce a magnetic field in each rotary magnet unit and also magnetize the reaction surface. In other words, a magnetic field also arises in the reaction surface. On rotation of the rotary magnetic unit relative to the reaction surface, electric charge in the magnetic field of the rotary magnet unit is moved in a first direction of rotation and in the magnetized reaction surface in a second direction of rotation opposed to the first direction of rotation. The Lorentz force acts on the electric charge moved in the magnetic field. The Lorentz force is proportional to the movement velocity of the charge, acts perpendicularly to the field lines of the magnetic field and perpendicularly to the movement direction of the charge. Since both the magnetic field of the rotary magnet unit exerts Lorentz forces on the moved charge of the rotary magnet unit and the magnetic field of the reaction surface exerts Lorentz forces on the moved charge of the reaction surface upon rotation of the rotary magnet unit relative to the reaction surface, the rotary magnet unit and thus the magnetically levitated unit is held at a distance from the at least one reaction surface by the Lorentz forces acting in opposite directions. The directed drive force that can also be generated on account of the opposite directions of rotation of the rotary magnet units of each pair is used to cause a movement of the magnetically levitated unit relative to the reaction surface.

Since the rotary magnet units in each magnetically levitated unit are always provided in pairs and the rotary magnet units of each pair also always rotate in opposite directions relative to one another upon rotation of the rotary magnet units, the two opposed rotary movements of the rotary magnet units of each pair at the same rotation speed and with an analogous rotary movement of the rotary magnet units per pair cause a linear movement of the magnetically levitated unit with respect to the at least one reaction surface, and at the same speed of rotation and with non-analogous, that is, mirrored rotary movement of the rotary magnetic units of each two pairs, cause the magnetically levitated unit to stop with respect to the at least one reaction surface. In other words, in the latter case, the opposed drive forces of each two pairs of rotary magnet units cancel each other out.

If the material surface is a fiber composite surface, the at least one magnetizable reaction surface is to be provided on a first side of the fiber composite surface. Such an at least one magnetizable reaction surface may be at least one section of a carrier structure supporting the fiber composite surface, for example. Alternatively to this, the reaction surface may be provided as a component separate from a carrier structure supporting the fiber composite surface, for example in the form of a magnetizable plate. The at least one magnetically levitated unit is then to be provided on a second side of the fiber composite surface lying opposite the first side. For contactless movement relative to the fiber composite surface, the forces holding the at least one magnetically levitated unit at a distance from the at least one reaction surface act in such a way that the distance maintained due to these forces between the at least one magnetically levitated unit and the at least one reaction surface permits a contactless take-up of the fiber composite surface between the at least one magnetically levitated unit and the at least one reaction surface. Since the forces maintaining the distance, that is, the opposed Lorentz forces between magnetically levitated unit and reaction surface, are proportional to the velocity of the charge movement in the magnetic fields of the rotary magnet units of the magnetically levitated unit and the reaction surface, a desired distance between magnetically levitated unit and reaction surface can be set by appropriate control of the rotation speed of the rotary magnet units. In other words, by suitable control of the rotation speeds of the rotary magnet units, fiber composite surfaces of fiber composite components of differing thickness can be taken up between magnetically levitated unit and reaction surface.

The at least one magnetically levitated unit preferably has at least one group with two pairs of rotary magnet units supported rotatably on the magnetically levitated unit. To achieve the stabilization effect described below, the rotary magnet units of this group may not be arranged in a row. On the contrary, it is especially advantageous if the orientation of the pairs in the group is perpendicular to the orientation of the two rotary magnet units per pair. Four rotary magnet units per magnetically levitated unit are particularly advantageous, as these permit a controlled distance of the magnetically levitated unit from the reaction surface to be maintained as well as a more controlled movement of the magnetically levitated unit relative to the reaction surface. If a magnetically levitated unit only has one pair of rotary magnet units, variations in the distance between magnetically levitated unit and reaction surface can occur, as the orientation of the magnetically levitated unit relative to the reaction surface can only be kept stable in pair orientation of the rotary magnet units and not perpendicular to this. As already mentioned earlier, due to the opposite directions of rotation of the rotary magnet units of each pair, a stationary force holding the magnetically levitated unit stationary relative to the reaction surface can be produced alternatively to the directed drive force moving the magnetically levitated unit relative to the reaction surface. However, this presupposes that the pairs of rotary magnet units are again provided in pairs, so that opposedly acting drive forces of two pairs of rotary magnet units can cancel each other out.

The at least one magnetically levitated unit may further have at least one drive arrangement for the rotary drive of the rotary magnet units. Due to appropriate translations, a single drive arrangement may be provided for all rotary magnet units. Separate drive arrangements may also be provided for individual groups of rotary magnet units. For example, the two rotary magnet units per pair may be driven by one drive unit. It is also conceivable, however, to provide a separate drive unit for each rotary magnet unit. A drive unit for the rotary drive of the rotary magnet unit(s) may be a motor, preferably an electric motor. If at least one electric motor is provided in the magnetically levitated unit for the rotary drive of the rotary magnet units, then the magnetically levitated unit further advantageously comprises a battery for supplying the electric motor with current.

A signal receiver for receiving control signals controlling the rotary drive of the rotary magnet units and thus the movement of the magnetically levitated unit is preferably also provided on the at least one magnetically levitated unit. The rotary drive of the rotary magnetic units, that is, the at least one drive unit, is then advantageously coupled to the signal receiver for signal transmission. The magnetically levitated unit may be moved by corresponding control signals, that is, corresponding rotary drive of the individual rotary magnet units, along a predetermined path relative to the at least one reaction surface and thus relative to the (fiber composite) material surface. As already mentioned, with the same rotation speed and analogous rotary movement of the rotary magnet units per pair, the two opposite directions of rotation of the rotary magnet units of each pair cause a linear movement of the magnetically levitated unit with respect to the at least one reaction surface and thus with respect to the (fiber composite) material surface. To deviate from the linear movement, different rotation speeds of the two opposed rotary movements of the rotary magnet units of at least one pair are necessary.

To generate control signals controlling the rotary drive of the rotary magnet units, the magnetically levitated arrangement may further comprise a signal generator as well as a signal transmitter actively coupled to the signal generator for signal transmission, in order to transmit the control signals of the signal generator. The signal generator may be a computer. The signal transmitter may be a router. The control signals to be transmitted are preferably radio signals. The computer may have a program, which specifies a path to be traveled by the at least one magnetically levitated unit relative to the material surface. The control signals are then preferably generated according to this program.

Furthermore, the magnetically levitated arrangement may have at least one carrier section for carrying at least one operating unit by means of the at least one magnetically levitated unit. Alternatively or in addition to this, the at least one carrier section may be used to carry transport goods by means of the at least one magnetically levitated unit. The at least one operating unit is preferably formed to execute at least one work step automatically in the manufacture and/or maintenance and servicing of the (fiber composite) material surface. Possible operating units that can be cited, by way of example, are a suction robot for vacuuming the (fiber composite) material surface, a drilling robot for drilling holes in the (fiber composite) material surface, a (laser) welding and/or cutting robot, a riveting robot, a painting robot, a papering robot for applying fiber layings, fiber matrix layers and/or strips, such as matrices or adhesive strips (in any form, also such as, e.g., logos), for example.

If the magnetically levitated arrangement comprises a plurality of magnetically levitated units, the at least one carrier section can be carried by at least a portion of the plurality of magnetically levitated units. It is thus conceivable that a carrier section is carried by several magnetically levitated units. The portion of the plurality of magnetically levitated units carrying the carrier section, that is, the several magnetically levitated units carrying the carrier section, is then preferably coupled movably to the carrier section. The movable coupling may be realized as joint kinematics. The movable coupling may be controlled in order to orient the carrier section and thus the operating unit and/or load carried relative to the reaction surface and thus relative to the (fiber composite) material surface. A suitable control device for this may be provided in the carrier section. This can, in particular, synchronize the movable couplings of the magnetically levitated units.

Such magnetically levitated units coupled movably to the carrier section are particularly advantageous if the (fiber composite) material surface, relative to which a movement is to be performed, has significantly curved regions, that is, regions with small radii of curvature, or steps, thresholds or other irregularities relative to which or over which the magnetically levitated units are to be moved. Significantly curved regions and/or irregularities of this kind occur above all on (fiber composite) material surfaces in the interior fuselage area of an aircraft. A prerequisite for this is that the substructure or the supporting structure of material surfaces that are not magnetizable or at least not sufficiently magnetizable, such as fiber composite surfaces, with significantly curved regions and/or irregularities of this kind, is sufficiently magnetizable to function as reaction surface(s) of the magnetically levitated arrangement in particular even in the regions with significant curvature and/or with irregularities.

Since the carrier section is carried by several magnetically levitated units, it is thus also possible with such a construction to move operating units and/or loads relative to inhomogeneous surfaces if the surfaces themselves or at least their substructure or supporting structure are sufficiently magnetizable to function as reaction surface(s) of the magnetically levitated arrangement. Steps can then be mastered, for example, obstacles overcome or the magnetically levitated units moved in a pipe of fiber composite material, such as can be provided in an aircraft. A carrier section is preferably coupled movably to at least four magnetically levitated units. Depending on the location and position of deployment, it is also conceivable to carry operating unit(s) and/or load(s) in use of the magnetically levitated arrangement optionally on a top side of the carrier section facing away from the reaction surface or also on an underside of the section lying opposite the top side and facing the reaction surface.

Alternatively to this, if the magnetically levitated arrangement comprises a plurality of magnetically levitated units, at least one magnetically levitated unit may have at least one coupling section for coupling to at least one other magnetically levitated unit. Several magnetically levitated units coupled to one another in this way permit the carrying of larger and/or heavier components, such as operating units and/or loads, on their at least one carrier section. It is also conceivable that two magnetically levitated units for mutual coupling each have a coupling section for coupling to the complementary coupling section of the other magnetically levitated unit.

In the case of magnetically levitated units coupled directly, that is, by coupling, or indirectly, i.e., by the carrier section, the control, that is, the drive, of the individual magnetically levitated units takes place preferably taking account of the activation of the coupled magnetically levitated units. In other words, the movements of the coupled magnetically levitated units are preferably coordinated with one another. The control of coupled magnetically levitated units generally takes place advantageously in such a way that the at least one carrier section and thus the operating unit(s) and/or load(s) carried is/are moved on a predetermined path relative to the at least one reaction surface and thus relative to the fiber composite surface.

The magnetically levitated arrangement previously described is preferably used for contactless movement relative to a (fiber composite) material surface in the manufacture and/or servicing of a fiber composite component, in particular an aircraft fiber composite component. For this application the magnetically levitated arrangement may carry at least one operating unit for carrying out manufacturing and/or servicing jobs on the fiber composite component. Examples of such an operating unit can be found in the preceding description.

The magnetically levitated arrangement previously described can naturally also be used for finishing, cleaning, servicing, etc., a magnetizable material surface (reaction surface of the arrangement) or for contactless load transport relative to this magnetizable surface. The materials in relation to which the magnetically levitated arrangement facilitates contactless movement are thus not limited to fiber composites. The distance maintained between magnetically levitated unit(s) and reaction surface due to the Lorentz forces does not then have to be adjusted in such a way that this permits the take-up of a fiber composite surface between magnetically levitated unit(s) and reaction surface.

Advantages of the magnetically levitated arrangement of the present application are that:

the material surface does not experience any wear due to the magnetically levitated arrangement when manufacturing or servicing jobs are carried out on it, due to the contactless movement by means of the magnetically levitated arrangement, no dirt is carried onto the material surface and no risk exists of damage to the surface either, even movement relative to inhomogeneous material surfaces is possible, due to the contactless movement by means of the magnetically levitated arrangement, no set-up times on the material surface arise, at least not if the material surface itself or at least its substructure is sufficiently magnetizable, and that due to the magnetic attraction force, jobs can be carried out with the magnetically levitated arrangement even in positions in which gravity would cause operating devices not in adhesive contact with the material surface to fall off, e.g., overhead against gravity.

BRIEF DESCRIPTION OF THE DRAWINGS

Preferred embodiments are now explained in greater detail with reference to the enclosed schematic drawings, of which

The same reference signs are used below for identical components.

DETAILED DESCRIPTION OF THE PREFERRED EMBODIMENTS

Figure 2:
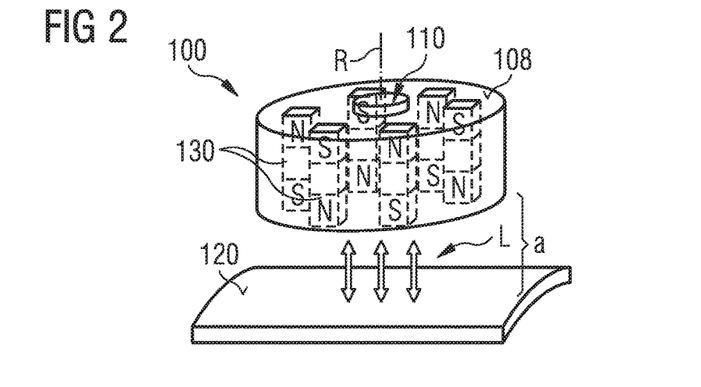
FIG. 2 shows an isometric view of a single rotary magnet unit interacting with a reaction plate.

FIG. 2 illustrates the principles of action underlying the function of the magnetically levitated arrangement of the present application. FIG. 2 shows a rotary magnet unit 100, which on a top side 108 has a pivot bearing 110 for rotating the rotary magnet unit 100 about an axis of rotation R. The rotary magnet unit 100 is arranged relative to a reaction surface 120 of copper and oriented with its underside lying opposite the top side 108 relative to the reaction surface 120. Taken up in the rotary magnet unit 100 is a plurality of permanent magnetic elements 130, which are arranged with alternating poles and the poles of which are oriented parallel to the axis of rotation R. Due to the alternating pole orientation of adjacent magnetic elements 130 in the rotary magnet unit 100, virtually no magnetic effect is detectable any longer outwardly, that is, outside the rotary magnet unit 100.

If the rotary magnet unit 100 is oriented with its axis of rotation R substantially perpendicularly with respect to the reaction surface 120 and is rotated, this interacts with the reaction surface 120 in such a way that forces L holding the rotary magnet unit 100 at a distance from the reaction surface 120 are generated.

The magnetic elements 130 of the rotary magnet unit 100 produce a magnetic field in the rotary magnet unit 100 and also magnetize the reaction surface 120. In other words, a magnetic field is also created in the reaction surface 120. Upon rotation of the rotary magnet unit 100 relative to the reaction surface 120 counter-clockwise about the axis of rotation R, electric charge is moved counter-clockwise in the magnetic field of the rotary magnet unit 100 and clockwise in the magnetic field of the magnetized reaction surface 120. The Lorentz force acts on the electric charge moved in the magnetic field. Since both the magnetic field of the rotary magnet unit 100 exerts Lorentz forces on the moved charge of the rotary magnet unit 100 and the magnetic field of the reaction surface 120 exerts Lorentz forces on the moved charge of the reaction surface 120 upon rotation of the rotary magnet unit 100 relative to the reaction surface 120, the rotary magnet unit 100 is held at a distance a from the reaction surface 120 by the Lorentz forces L acting in opposite directions. The distance a is a function of the rotation speed of the rotary magnet unit and can be set in such a way that a non-magnetizable or at least insufficiently magnetizable material surface to be processed can be taken up between rotary magnet unit 100 and reaction surface 120. If the reaction surface 120 is already the material surface to be processed, that is, if the material surface to be processed is sufficiently magnetizable to function as a reaction surface 120, this distance setting is thus not necessary. By material surface to be processed it is not only understood that jobs are to be carried out on the material surface, but rather generally that jobs are to be carried out relative to the material surface, that is, in particular, also load transports relative to the material surface.

Figure 3:
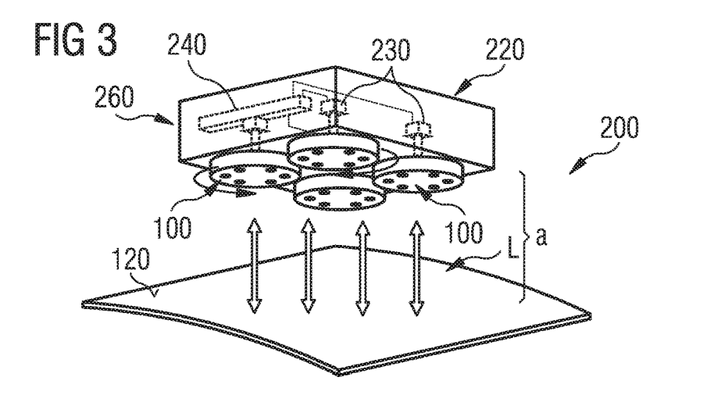
FIG. 3 shows an isometric view of a magnetically levitated arrangement of the present application.

FIG. 3 shows a magnetically levitated arrangement 200 of the present invention. In a magnetically levitated unit 220 of the same, four rotary magnet units 100 from FIG. 2 are taken up in a housing 260 and supported rotatably relative to the magnetically levitated unit 220. Each rotary magnet unit 100 is driven rotatably by an electric motor 230. To supply the electric motors 230 with energy, a battery 240 is also taken up in the housing 260 in the magnetically levitated unit 220. The four rotary magnet units 100 are arranged in two parallel rows in a rectangle relative to one another. The two rows run perpendicularly to the longitudinal orientation of the magnetically levitated unit 220. The underside of the magnetically levitated unit 220 and thus the undersides of the four rotary magnet units 100 are, as already shown in FIG. 2, arranged and oriented relative to a reaction surface 120 of copper.

Due to rotation of the rotary magnet units 100 relative to the reaction surface 120, these interact with the reaction surface 120 in such a way that forces L holding the magnetically levitated unit 220 at a distance from the reaction surface 120 are produced. This was already explained in detail with reference to FIG. 2.

For each row, the rotary magnet units 100 of the row pair are driven rotatably in analogous directions opposed to one another in order to bring about a directed movement of the magnetically levitated unit 220 relative to the reaction surface 120. If for each row the rotary magnet units 100 of the row pair are driven rotatably in directions opposite to one another but non-analogous, i.e., mirrored directions for each row, the magnetically levitated unit 100 hovers stationarily with respect to the reaction surface 120.

Figure 4:
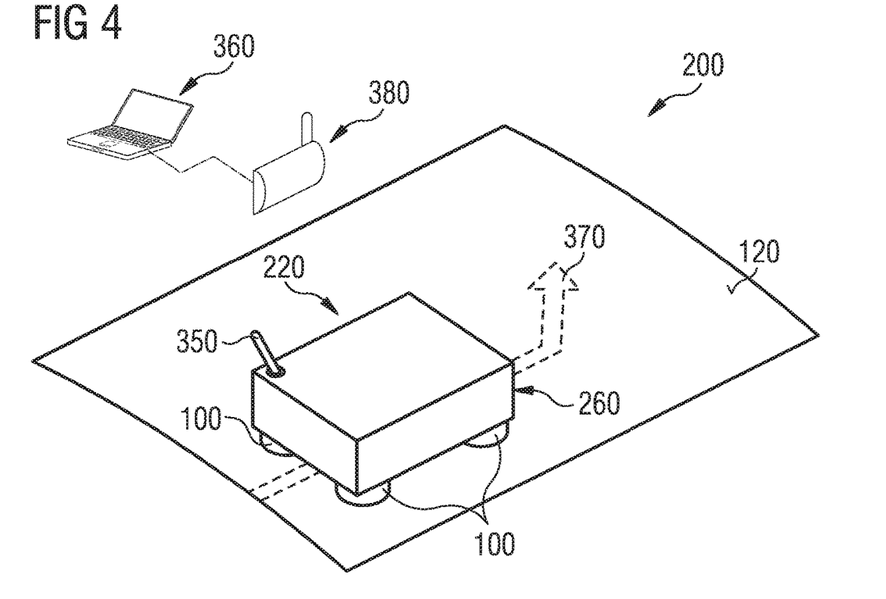
FIG. 4 shows the magnetically levitated arrangement from FIG. 3, which has components for the remotely controlled movement of the magnetically levitated unit relative to the reaction surface.

FIG. 4 shows the magnetically levitated arrangement 200 from FIG. 3 in another perspective. In addition to the general components according to FIG. 3, the magnetically levitated unit 220 is equipped with an aerial 350 for receiving radio signals relating to the control of the rotary magnet units 100. To generate the control signals, the magnetically levitated arrangement 200 further comprises a computer 360, which has a control program for controlling the magnetically levitated unit 220. The control program specifies a path 370 to be traveled by the magnetically levitated unit 220 relative to the reaction surface 120. To emit the control signals to the magnetically levitated unit 220, the computer 360 is linked to a router 380.

Figure 5:
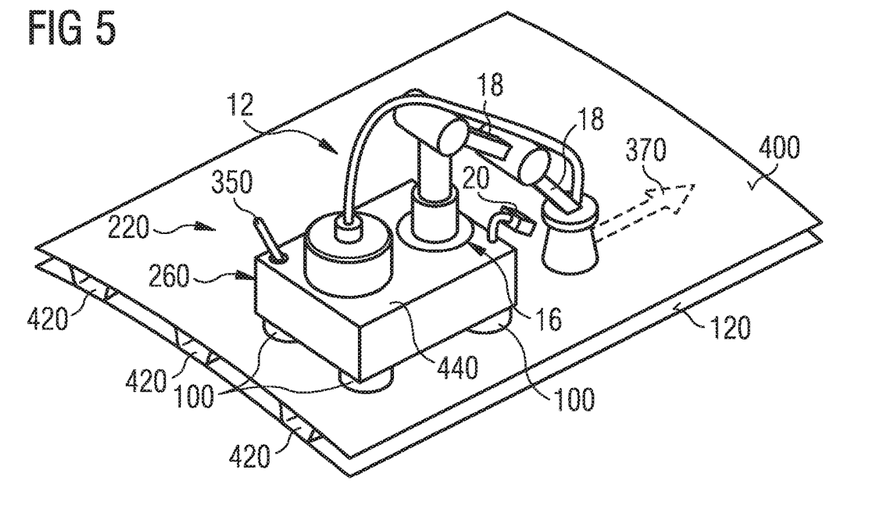
FIG. 5 shows an isometric view of a magnetically levitated arrangement from FIG. 3 with a suction robot for cleaning a fiber composite surface, FIGS. 6 *a*) to 6 *f*) show isometric views of the magnetically levitated unit of the magnetically levitated arrangement from FIG. 3 with various operating units or for carrying loads.

FIG. 5 shows a magnetically levitated arrangement 200, which travels a predetermined path 370 relative to a fiber composite surface 400. As shown with reference to FIG. 4, the magnetically levitated unit 220 is equipped with an aerial 350 for receiving radio signals relating to the control of the rotary magnet units 100 for travelling the path 370. The distance a described above with reference to FIG. 2, which distance is set due to the opposedly acting Lorentz forces L, is chosen here so that the fiber composite surface 400 and underlying supporting structure 420 are taken up between magnetically levitated unit 220 and reaction surface 120 and the magnetically levitated unit 220 can move contactlessly relative to the fiber composite surface 400. The reaction surface 120 can be attached temporarily to the supporting structure 420 for using the magnetically levitated arrangement 200 to carry out jobs relative to the fiber composite surface 400.

For surface cleaning of the fiber composite surface 400, the magnetically levitated unit 220 carries a suction robot 16 on its top side. The top side of the magnetically levitated unit 220 then serves as a carrier section 440 of the magnetically levitated arrangement 200. The suction robot 16 substantially corresponds to that from FIG. 1. Components of the suction robot 16 can be taken up in the housing 260 of the magnetically levitated unit 220. However, the suction robot 16 carried by the magnetically levitated unit 220 can work contactlessly even in positions on the fiber composite surface 400 in which gravity would cause operating devices such as that shown in FIG. 1, which are not in adhesive contact with the material surface, to fall off, that is, e.g., overhead against gravity.

Figure 6:
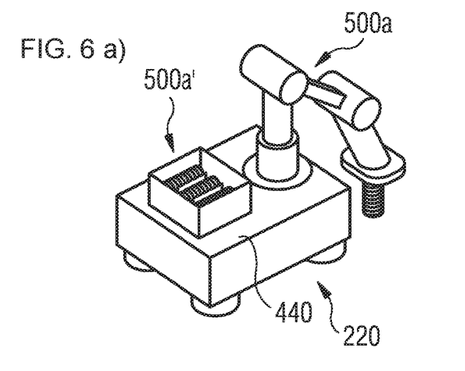

FIGS. 6 a) to 6 f) show magnetically levitated units 220 provided with various operating units 500a-500e and/or transport units 500a', 500c', 500f. The respective operating unit 500a-500e and/or transport unit 500a', 500c', 500f are/is carried on a carrier section 440 of the magnetically levitated unit 220 formed by the top side of the magnetically levitated unit 220. Components of the operating units 500a-500e can be taken up in the housing 260 of the magnetically levitated unit 220. The other components of the magnetically levitated arrangement 200 have been omitted for reasons of clarity in FIGS. 6 a) to 6 f).

FIG. 6 a) shows a magnetically levitated unit 220 carrying a drilling robot 500a as well as a transport unit 500a' providing various replacement drilling instruments.

FIG. 6 b) shows a magnetically levitated unit 220 carrying a laser welding or cutting robot 500b.

FIG. 6 c) shows a magnetically levitated unit 220 carrying a riveting robot 500c and a transport unit 500c' providing rivets.

FIG. 6 d) shows a magnetically levitated unit 220 carrying a painting robot 500d.

FIG. 6 e) shows a magnetically levitated unit 220 carrying a papering robot 500e. The papering robot 500e is used, e.g., to apply fiber layings, fiber matrix layers and/or strips, such as matrices or adhesive strips (in any form, such as also, e.g., logos) to a material surface, like the reaction surface 120 or the fiber composite surface 400.

FIG. 6 f) shows a magnetically levitated unit 220 carrying a transport unit 500f for transporting loads.

Figure 7:
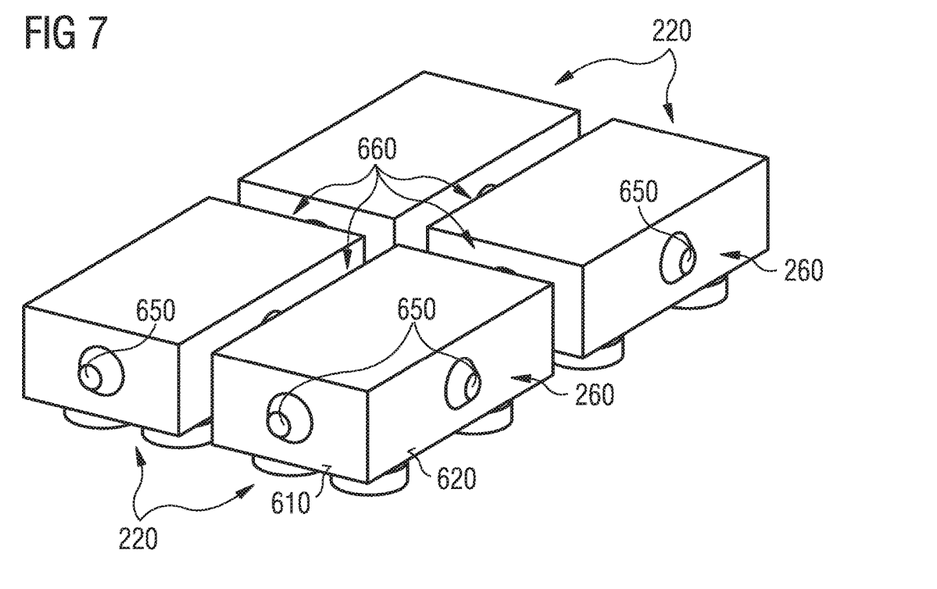
FIG. 7 shows an isometric view of coupled magnetically levitated units.

FIG. 7 shows the coupling of several magnetically levitated units 220 of the magnetically levitated arrangement 200 shown in FIG. 3 to one another. The reaction surface 120 has been omitted in FIG. 7 for the sake of clarity. For coupling to one another, each magnetically levitated unit 220 has a coupling mechanism 650 on an end face 610 and a side wall 620 of the housing 260. This is realized, for example, by suction technology, that is, as a suction cup with vacuum pump. The use of alternative coupling mechanisms of a known type is naturally also conceivable. The coupling mechanism 650 can also comprise two coupling means cooperating with one another for each coupling point 660. For reciprocal coupling each of two magnetically levitated units 220 to be coupled then comprises per coupling point 650 one of the two cooperating coupling means. For a coupling mechanism of the latter type, magnetism or detachable locking connections are possible, for example. The surfaces of several magnetically levitated units 220 coupled to one another can together form a carrier section and thus facilitate the movement of heavier and/or larger operating units and/or loads.

Figure 8:
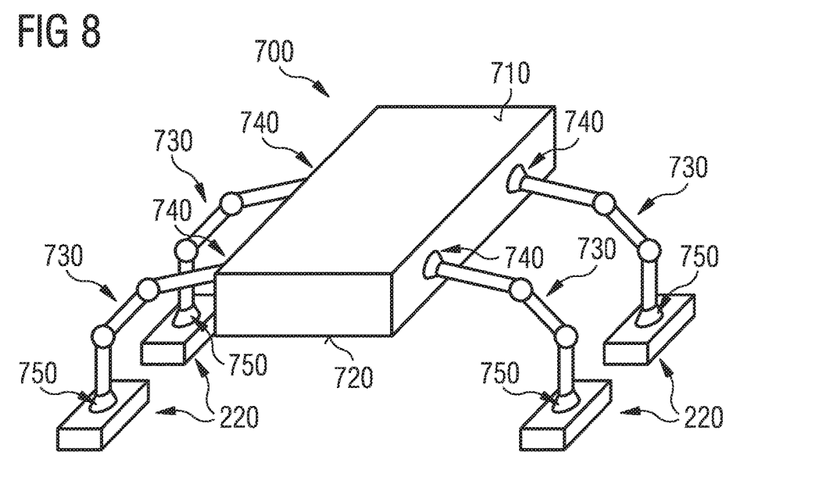
FIG. 8 shows an isometric view of a carrier section coupled movably to several magnetically levitated units, and FIGS. 9 *a*) to 9 *c*) show side views of a magnetically levitated arrangement of the present application when mastering a step, when moving over an obstacle and when moving in a pipe, wherein the magnetically levitated arrangement has the carrier section from FIG. 8 coupled movably to several magnetically levitated units.

FIG. 8 shows an alternative coupling to FIG. 7 of several magnetically levitated units 220 of the magnetically levitated arrangement 200 to one another. Several magnetically levitated units 220 are coupled movably here to a carrier section 700. The carrier section 700 is not the surface of one or more magnetically levitated units 220 here, but rather a separate element to which the magnetically levitated units 220 are coupled movably. The carrier section 700 serves, as already described earlier with reference to FIG. 5 and FIGS. 6 a) to 6 f) for a carrier section 440 formed by the surface of the housing 260 of a magnetically levitated unit 220, to carry at least one operating unit and/or at least one transport unit. Depending on the location and position of deployment, the operating unit(s) and/or transport unit(s) can in this case be carried in use of the magnetically levitated arrangement 200 optionally on a top side 710 facing away from the reaction surface 120 or also on an underside 720 of the section lying opposite the top side 710 and facing the reaction surface 120. The movable coupling of each magnetically levitated unit 220 to the carrier section 700 is accomplished by means of a 3-part hinged arm 730, for example. A starting part 740 of the hinged arm 730 is mounted in this case movably by its free end on the carrier section 700 and an end part 750 of the hinged arm 730 is mounted movably by its free end on the magnetically levitated unit 220, in particular, on the top side of its housing 260. A control unit for the synchronized control of the hinged arms 730 is preferably provided in the carrier section 700. The mode of operation of each individual magnetically levitated unit 220 was already described with reference to FIG. 3.

Figure 9:
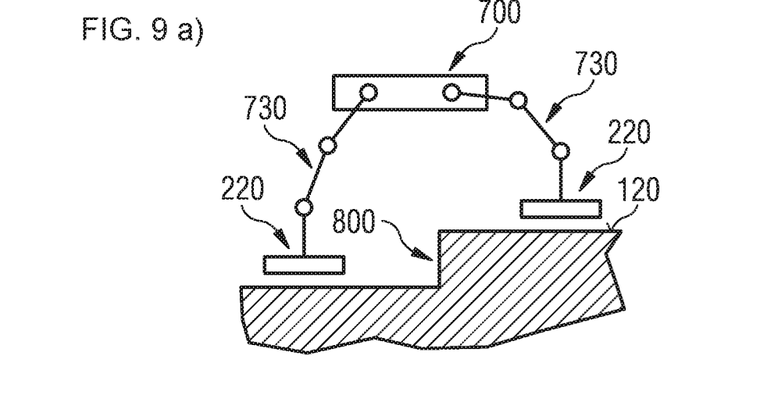

According to FIG. 8, magnetically levitated units 220 coupled to the carrier section 700 can be used especially well under more structurally complex material surface conditions for contactless movement relative to the material surface. At least three of the four magnetically levitated units 220 shown are always interacting with the reaction surface 120 in this case in order to hold the carrier section 700 stably and in a desired orientation relative to the material surface. This is now briefly explained with reference to three exemplary material surface conditions, as shown in FIGS. 9 *a*) to 9 *c*). The material surfaces shown in FIGS. 9 *a*) to 9 *c*) are magnetizable and thus function as a reaction surface 120 of the magnetically levitated arrangement 200.

FIG. 9 *a*) shows a step 800 in the material surface or the reaction surface 120. Starting with a magnetically levitated unit 220 situated closest to the step 800, the control of the movable couplings between carrier section 700 and the magnetically levitated units 220 controls the respective hinged arms 730 in turn to master the step 800.

FIG. 9 *b*) shows a threshold 810 in the material surface or the reaction surface 120. Starting with a magnetically levitated unit 220 situated closest to the threshold 810, the control of the movable couplings between carrier section 700 and the magnetically levitated units 220 controls the respective hinged arms 730 in turn to master the threshold 810.

FIG. 9 *c*) shows a recess 820 in the form of a circle segment in the material surface or the reaction surface 120, as in the case of a cross section through a pipe segment, for example. In other words, FIG. 9 *c*) illustrates the movement of magnetically levitated units 220 coupled movably to the carrier section 700 in a pipe. Even in the case of movement relative to such a significantly curved material surface or reaction surface 120, it is important for the stabilization of the carrier section 700 that at least three of the four magnetically levitated units 220 shown are always interacting with the reaction surface 120. If the movement takes place in a longitudinal direction through the pipe and if a suitable relative orientation of the magnetically levitated units 220 relative to the carrier section 700 is found for the stable carrying of the same through the pipe, then for the further longitudinal movement in the pipe all four magnetically levitated units 220 remain in interaction with the curved material surface or reaction surface 120.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A magnetically levitated arrangement for contactless movement relative to a material surface, comprising:
at least one magnetizable reaction surface, and
at least one magnetically levitated unit, which is adapted to be arranged relative to the reaction surface so as to interact therewith, wherein the magnetically levitated unit has at least one pair of rotatably supported rotary magnet units, each rotary magnet unit being rotatable about an axis of rotation and having a plurality of magnetic elements arranged with alternating poles and respectively substantially parallel to the axis of rotation perpendicularly to the reaction surface, and each pair of the rotary magnet units being formed to interact, due to rotation of the two rotary magnet units in opposite directions relative to one another and relative to at least one reaction surface, in such a way with the reaction surface that
forces holding the at least one magnetically levitated unit at a distance from the at least one reaction surface are generated,
due to the opposite directions of rotation of the rotary magnet units of each pair, a directed drive force moving the magnetically levitated unit relative to the reaction surface can be generated, and
a fiber composite surface disposed between the at least one reaction surface and the at least one magnetically levitated unit,
wherein a contactless movement relative to the fiber composite surface is achieved by the at least one magnetically levitated unit,
wherein the forces holding the at least one magnetically levitated unit at a distance from the at least one reaction surface act so that the distance maintained due to these forces between the at least one magnetically levitated unit and the at least one reaction surface permits a contactless take-up of the fiber composite surface between the at least one magnetically levitated unit and the at least one reaction surface.

2. The magnetically levitated arrangement according to claim 1, wherein the at least one magnetically levitated unit has at least one group with two pairs of rotary magnet units supported rotatably on the magnetically levitated unit and, due to the opposite directions of rotation of the rotary magnet units of each pair, a stationary force holding the magnetically levitated unit stationary relative to the reaction surface can also be generated alternatively to the directed drive force moving the magnetically levitated unit relative to the reaction surface.

3. The magnetically levitated arrangement according to claim 1, wherein the at least one magnetically levitated unit has at least one drive arrangement for the rotary drive of the rotary magnet units.

4. The magnetically levitated arrangement according to claim 1, wherein a signal receiver for receiving control signals controlling the rotary drive of the rotary magnet units and thus the movement of the magnetically levitated unit is provided on the magnetically levitated unit.

5. The magnetically levitated arrangement according to claim 1, further comprising a signal generator for generating control signals controlling the rotary drive of the rotary magnet units as well as a signal transmitter actively coupled to the signal generator for signal transmission for transmitting the control signals of the signal generator.

6. The magnetically levitated arrangement according to claim 1, further comprising at least one carrier section for carrying at least one of at least one operating unit and transport goods by means of the at least one magnetically levitated unit.

7. The magnetically levitated arrangement according to claim 6, comprising a plurality of magnetically levitated units, wherein the at least one carrier section is carried by the plurality of magnetically levitated units.

8. The magnetically levitated arrangement according to claim 7, wherein the plurality of magnetically levitated units is movably coupled to the carrier section.

9. The magnetically levitated arrangement according to claim 1, comprising a plurality of magnetically levitated units, wherein at least one magnetically levitated unit has at least one coupling section for coupling to at least one other magnetically levitated unit.

10. The magnetically levitated arrangement according to claim 9, wherein two magnetically levitated units for reciprocal coupling each have a coupling section for coupling to a complementary coupling section of the other magnetically levitated unit.

11. The use according to claim 1, wherein the magnetically levitated arrangement carries at least one operating unit for carrying out at least one of manufacturing and servicing jobs on the fiber composite surface.

* * * * *